2,732,293

PROCESS FOR RECOVERING MANGANESE FROM BASIC OPEN-HEARTH SLAGS

Rene Perrin, Paris, France, assignor to Societe d'Electro-Chimie d'Electro-Metallurgie et des Acieries Electriques d'Ugine, Paris, France No Drawing. Application June 9, 1953, Serial No. 360,581

8 Claims. (Cl. 75—24)

This invention relates to a process for recovering manganese from basic open-hearth slags.

These slags contain substantial proportions of manganese, for example 5 to 10%. They also contain large quantities of iron, and as impurities, the sulphur and phosphorus they have absorbed in the course of the operation of refining steel. It is essentially the presence of these two elements which makes these slags unsuitable for being re-used directly in an open-hearth furnace.

One of the proposed processes for recovering manganese from basic open-hearth slags consists in reducing them in a blast-furnace so as to obtain a ferro-manganese or a spiegel; but the metal thus obtained contains prohibitive quantities of phosphorus and must be subjected to a second treatment, for example a blowing in a converter, to obtain a new slag rich in manganese and poor in phosphorus, which, in its turn, is subjected to a new reducing operation. Such a process is expensive and requires the use of expensive equipment.

The present invention enables one to avoid these disadvantages and conduces to an easy and inexpensive recovery of manganese.

The invention consists essentially, first in converting the basic open-hearth slag into an acid slag by incorporation of acid elements, in effecting a partial reduction of this acid slag so as to remove the greatest part of the phosphorus and sulphur, while keeping most of the manganese in the slag, and in re-using the slag thus refined as a raw material for producing manganese.

The practical carrying out of the invention can be made in various ways, some of which are described hereinafter.

One of the elements of the invention is first to give to the open-hearth slag to be treated acid properties. In case one takes off the slag to be treated directly from the open-hearth furnace, one can introduce this slag in the liquid state into an electric furnace and add to it in this furnace suitable quantities of an acid element. Among such elements, silica is the best and less expensive. The quantity of silica to introduce depends of course on the composition of the slag to be treated. It will be the greater, all other things being equal, the greater the quantity of phosphorus to be eliminated. It will also depend on the degree of reduction to which the acid slag will be subjected, as the acidity may be less the greater is the degree of reduction. Practically, for the most usual open-hearth slags, an addition of 300 to 600 kgs. of silica per ton of slag will be suitable. It is possible, especially in case of a far going reduction, which is desirable for a good dephosphorization, to add, before or during reduction, small amounts of fluidifying material to prevent the slag from becoming too viscous.

The partial reduction of the slag, in the case which has been considered of transferring the slag to an electric furnace, can be made, for instance, by means of an addition, in this same furnace, of a suitable amount of carbon. It is advisable to carry out the reduction until the iron content of the slag is lowered to about 5–10%. Under these conditions, a metallic bath will be formed under the acid slag, the metal bath being composed essentially of the iron reduced from the slag and containing only a small amount of manganese but nearly the whole phosphorus and sulphur contained originally in the slag. Sulphur and phosphorus, which are liable to hinder subsequent use of the slag, are thus eliminated from the slag. Because of the acid properties given to the slag by the addition of silica, almost all the manganese remains in the slag, in spite of the important reduction of the iron oxide.

Other elements such as silicon or aluminium can be used as reducing agents, with or without carbon. The main thing is to carry out the reduction so as to promote the formation of a ferrous bath containing most of the phosphorus and sulphur of the slag.

The phosphorus and sulphur elimination can be promoted by adding to the slag, in the electric furnace, iron in the form of scrap, turnings or cast iron. The iron can promote the reduction of the phosphorus of the slag and besides is used for diluting this element and thus acting in the right way on its distribution between the slag and the metal.

The acidification and partial reduction of the slag can be carried out, as we have mentioned, in an electric furnace; but one can also carry out the acidification in a furnace, and after that stir strongly the acidified slag with a ferrous bath containing a reducing agent. If the slag has been strongly acidified and if its iron oxide content is not too high, the action of the iron or cast iron bath can be sufficient to obtain an at least partial reduction of the slag on condition that one processes with a sufficient amount of ferrous metal.

Another variant of the process consists in forming a charge of solid, basic open-hearth slag, silica and a reducing agent and melting the charge in a blast furnace, water-jacketed furnace, electric furnace or any other suitable device. This variant applies especially in case one desires to recover old slags of open-hearth steel works stocked in the plants. The reducing agent generally used in that case is preferably coke.

The metallic bath resulting from the partial reduction of the slag contains more or less important quantities of phosphorus, for example, up to 10%. In that case, it can be used as a raw material to extract phosphorus from it. However, if one uses a sufficient quantity of metallic iron in the operation of partial reduction of the slag, one can obtain phosphorus contents within the range of 1 to 2% and the metal in question, after a possible addition of carbon, can be subjected to a subsequent operation of dephosphorization, for example by blowing it in a basic converter.

Whatever the method employed for the open-hearth slag acidification and partial reduction may be, these operations will generally be followed in accordance with the invention by a re-utilization of the manganese kept in the oxide form in the slag. Many variants can be employed for this purpose.

One can, for example, use directly the partially reduced slag as an element for the formation of the slag of a subsequent open-hearth operation, the addition of the slag treated in accordance with the invention introducing thus into the operation the manganese it contains. In that case, it will be necesary to make a lime addition so as to give again to the slag its required basic properties. It will not be possible to re-use in the same steel-works the whole slag resulting from the preceding operations, but one will have introduced into the circuit an important quantity of manganese. This method enables the loading in the open-hearth furnace of a cast iron with a manganese content lower than the usual cast irons.

Another solution consists in using the open-hearth slag, after elimination of its sulphur and phosphorus in accordance with the invention, as a raw material from which it is easy to extract manganese, for example by reduction, in the form of ferro-manganese or silico-manganese. This second solution enables a nearly complete recovery of the manganese contained in the slag. It will be possible to carry out this reduction according to all methods known for producing ferro-manganese, silico-manganese or spiegels.

The following examples illustrate various ways in which the process may be carried out:

Example 1

The basic open-hearth slag to be treated to recover its manganese content was composed of:

| | |
|---|---|
| $SiO_2$ | 18 |
| $CaO$ | 22 |
| $Al_2O_3$ | 4.75 |
| $MgO$ | 6 |
| $FeO$ | 33.5 |
| $MnO$ | 10.3 |
| $P_2O_5$ | 2.2 |
| $S$ | 0.13 |

This slag was poured from the open-hearth furnace into a ladle and was then introduced into an electric furnace. About 400 kgs. of silica were added per ton of slag and after the whole charge was well fused, successive charges of coke were distributed uniformly on the bath surface. Heating of the slag was continued and charges of coke were made until the iron oxide content of the slag had lowered to 6 to 7%.

The slag at that moment was composed of:

| | |
|---|---|
| $SiO_2$ | 53 |
| $CaO$ | 20 |
| $Al_2O_3$ | 4.35 |
| $MgO$ | 5.5 |
| $FeO$ | 6.5 |
| $MnO$ | 8 |
| $P_2O_5$ | 0.1 |
| $S$ | 0.03 |

A metallic bath had been formed under the slag, the bath containing 2.9% phosphorus and 4.2% manganese, the balance being essentially iron. The thus purified slag from which most of the phosphorus and sulphur had been eliminated but which still contained most of the manganese in the form of oxide, was discharged from the furnace and re-used in subsequent charges of an open-hearth steel making furnace, with an addition of 400 kgs. of lime per ton of acidified and reduced slag.

Example 2

The same open-hearth slag as that used in Example 1 was acidified in th same manner but this time by an addition of 500 kgs. of silica per ton of slag, followed by a reduction carried out until the slag contained about 9% of FeO. At the end of this reduction the composition of the slag was:

| | Percent |
|---|---|
| $SiO_2$ | 54 |
| $CaO$ | 18 |
| $Al_2O_3$ | 3.8 |
| $MgO$ | 4.8 |
| $FeO$ | 9 |
| $MnO$ | 7 |
| $P_2O_5$ | 0.4 |
| $S$ | 0.05 |

The metal resulting from this reduction contained 2% of phosphorus and about 2% of manganese, the balance being essentially iron.

In Example 2, although a greater amount of silica was added to the slag, the dephosphorization of the slag was less because the reduction of the acidified slag was not carried out to as great an extent as in the case of Example 1.

The invention is not limited to the examples nor to the preferred procedures or ingredients, but may be otherwise embodied or practiced within the scope of the following claims.

I claim:

1. A process for recovering manganese from basic open-hearth slags containing iron and manganese oxides and also containing phosphorus and sulphur as impurities, which comprises converting the basic slag to an acid slag, subjecting the acid slag to partial reduction, regulating the amount of reduction to eliminate from the slag the greater part of the phosphorus and sulphur while retaining the greater part of the manganese in the slag in the form of oxide, separating the slag from the metal bath resulting from said partial reduction operation, and re-using the thus purified slag as a raw material for the recovery of manganese.

2. A process according to claim 1, wherein silica is added to the basic slag to convert it to an acid slag.

3. A process for recovering manganese from basic open-hearth slags containing iron and manganese oxides and also containing phosphorus and sulphur as impurities, which comprises converting the basic slag to an acid slag by adding thereto silica in amount of 300 to 600 kgs. per ton of slag, subjecting the acid slag to partial reduction, stopping the reduction when the iron content of the slag has been lowered to about 5–10%, thereby eliminating from the slag the greater part of the phosphorus and sulphur while retaining the greater part of the manganese in the slag in the form of oxide, separating the slag from the metal bath resulting from said partial reduction operation, and subjecting the thus purified slag to a reduction operation to recover manganese therefrom.

4. A process according to claim 3, wherein the thus purified slag is subjected to a reduction operation to recover manganese therefrom by utilizing it as a component of a basic slag employed in an open-hearth steel making operation.

5. A process according to claim 3, wherein the thus purified slag is subjected to a reduction operation to recover manganese therefrom in the form of a manganese alloy.

6. A process according to claim 3, wherein the thus purified slag is subjected to a reduction operation to recover manganese therefrom in the form of ferro-manganese.

7. A process according to claim 3, wherein the thus purified slag is subjected to a reduction operation to recover manganese therefrom in the form of silico-manganese.

8. A process for removing phosphorus and sulphur from basic open-hearth slags containing iron and manganese oxides, which comprises converting the basic slag to an acid slag, subjecting the acid slag to partial reduction, stopping the reduction when the iron content of the slag has been lowered to about 5–10%, thereby eliminating from the slag the greater part of the phosphorus and sulphur while retaining the greater part of the manganese in the slag in the form of oxide, and separating the slag from the metal bath resulting from said partial reduction operation.

References Cited in the file of this patent

UNITED STATES PATENTS

| 905,281 | Betts | Dec. 1, 1908 |
|---|---|---|
| 1,028,070 | Hiorth | May 28, 1912 |
| 1,754,845 | Bailey et al. | Apr. 15, 1930 |

FOREIGN PATENTS

| 102,433 | Sweden | Sept. 2, 1941 |
|---|---|---|